(12) United States Patent
Kim et al.

(10) Patent No.: US 8,055,199 B2
(45) Date of Patent: Nov. 8, 2011

(54) METHODS AND SYSTEMS FOR CO-CHANNEL INTERFERENCE CANCELLATION IN WIRELESS NETWORKS

(75) Inventors: Youngjae Kim, Cupertino, CA (US); Je Woo Kim, Cupertino, CA (US); Jong Hyeon Park, San Jose, CA (US); Madihally J. Narasimha, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 12/417,595

(22) Filed: Apr. 2, 2009

(65) Prior Publication Data
US 2010/0167653 A1 Jul. 1, 2010

Related U.S. Application Data

(60) Provisional application No. 61/142,159, filed on Dec. 31, 2008.

(51) Int. Cl.
*H04B 1/00* (2006.01)
(52) U.S. Cl. ...................... 455/63.4; 455/63.1
(58) Field of Classification Search .............. 455/63.1, 455/63.4
See application file for complete search history.

(56) References Cited

U.S. PATENT DOCUMENTS

| 6,308,085 | B1 | 10/2001 | Shoki |
| 2006/0153147 | A1 | 7/2006 | Chillariga et al. |
| 2008/0309554 | A1 | 12/2008 | Venkatesan |
| 2009/0190691 | A1* | 7/2009 | Ariyavisitakul et al. ..... 375/295 |

FOREIGN PATENT DOCUMENTS

EP 1408710 4/2004

OTHER PUBLICATIONS

Alcatel Shanghai Bell et al.: "Collaborative MIMO for LTE-A downlink," 3GPP Draft TSG RAN WG1 Meeting #53bis; R1-082501_DL Collaborative MIMO, 3RD Generation Partnership Project (3GPP), Warsaw, Poland; (Jun. 30, 2008), XP050110769, the whole document.
International Search Report and Written Opinion—PCT/US2009/068607, International Search Authority—European Patent Office—Mar. 8, 2010.

* cited by examiner

*Primary Examiner* — David Mis
(74) *Attorney, Agent, or Firm* — Milan I. Patel

(57) ABSTRACT

Certain embodiments of the present disclosure relate to methods for mitigating interference of signals transmitted to a mobile station (MS) from a plurality of neighboring base stations. By applying a proposed spatio-frequency modulation (SFM) technique at a serving base station (BS) and at each interfering BS, a co-channel interference (CCI) from interfering base stations can be efficiently mitigated at the MS and signal transmitted from the serving BS can be more accurately decoded.

48 Claims, 12 Drawing Sheets

$$f(k) \quad f(k+1)$$
$$\begin{bmatrix} S_1 & S_1 e^{j\theta_1} \\ S_2 & S_2 e^{j\theta_2} \end{bmatrix} \begin{matrix} \leftarrow \textit{Antenna 1} \\ \leftarrow \textit{Antenna 2} \end{matrix}$$

FIG. 12

METHODS AND SYSTEMS FOR CO-CHANNEL INTERFERENCE CANCELLATION IN WIRELESS NETWORKS

CLAIM OF PRIORITY

This Application for Patent claims the benefit of priority from U.S. Provisional Patent Application Ser. No. 61/142,159, entitled "Co-channel interference cancellation with a new spatio-frequency modulation" and filed Dec. 31, 2008, which is assigned to the assignee of this application and is fully incorporated herein by reference for all purposes.

TECHNICAL FIELD

Certain embodiments of the present disclosure generally relates to wireless communications and, more particularly to a method for interference cancellation of signals transmitted from base stations located around a mobile station.

SUMMARY

Certain embodiments of the present disclosure provide a method for a wireless communications. The method generally includes generating at least one symbol of data to be transmitted, obtaining information about a number of neighboring base stations M around a served mobile station (MS), and transmitting, on one or more antennas from each of the M neighboring base stations, at least one symbol in N frequency tones with N different phases using a phase pattern from a selected set of phase patterns, wherein the set of phase patterns is selected based on a level of co-channel interference (CCI) at the MS.

Certain embodiments of the present disclosure provide a method for a wireless communications. The method generally includes receiving, on one or more antennas, symbols transmitted from one or more neighboring base stations, wherein at least one symbol is transmitted from at least one antenna of each base station in N frequency tones with N different phases using a phase pattern from a selected set of phase patterns, and spatially processing the received symbols to eliminate interference and to decode one or more symbols transmitted from one or more antennas of a serving base station, and wherein the set of phase patterns is selected based on a level of co-channel interference (CCI) at a mobile station (MS).

Certain embodiments of the present disclosure provide an apparatus for a wireless communications. The apparatus generally includes logic for generating at least one symbol of data to be transmitted, logic for obtaining information about a number of neighboring base stations M around a served mobile station (MS), and logic for transmitting, on one or more antennas from each of the M neighboring base stations, at least one symbol in N frequency tones with N different phases using a phase pattern from a selected set of phase patterns, wherein the set of phase patterns is selected based on a level of co-channel interference (CCI) at the MS.

Certain embodiments of the present disclosure provide an apparatus for a wireless communications. The apparatus generally includes logic for receiving, on one or more antennas, symbols transmitted from one or more neighboring base stations, wherein at least one symbol is transmitted from at least one antenna of each base station in N frequency tones with N different phases using a phase pattern from a selected set of phase patterns, and logic for spatially processing the received symbols to eliminate interference and to decode one or more symbols transmitted from one or more antennas of a serving base station, and wherein the set of phase patterns is selected based on a level of co-channel interference (CCI) at a mobile station (MS).

Certain embodiments of the present disclosure provide an apparatus for a wireless communications. The apparatus generally includes means for generating at least one symbol of data to be transmitted, means for obtaining information about a number of neighboring base stations M around a served mobile station (MS), and means for transmitting, on one or more antennas from each of the M neighboring base stations, at least one symbol in N frequency tones with N different phases using a phase pattern from a selected set of phase patterns, wherein the set of phase patterns is selected based on a level of co-channel interference (CCI) at the MS.

Certain embodiments of the present disclosure provide an apparatus for a wireless communications. The apparatus generally includes means for receiving, on one or more antennas, symbols transmitted from one or more neighboring base stations, wherein at least one symbol is transmitted from at least one antenna of each base station in N frequency tones with N different phases using a phase pattern from a selected set of phase patterns, and means for spatially processing the received symbols to eliminate interference and to decode one or more symbols transmitted from one or more antennas of a serving base station, and wherein the set of phase patterns is selected based on a level of co-channel interference (CCI) at a mobile station (MS).

Certain embodiments of the present disclosure provide a computer-program product for a wireless communications, comprising a computer-readable medium having instructions stored thereon, the instructions being executable by one or more processors. The instructions generally include instructions for generating at least one symbol of data to be transmitted, instructions for obtaining information about a number of neighboring base stations M around a served mobile station (MS), and instructions for transmitting, on one or more antennas from each of the M neighboring base stations, at least one symbol in N frequency tones with N different phases using a phase pattern from a selected set of phase patterns, wherein the set of phase patterns is selected based on a level of co-channel interference (CCI) at the MS.

Certain embodiments of the present disclosure provide a computer-program product for a wireless communications, comprising a computer-readable medium having instructions stored thereon, the instructions being executable by one or more processors. The instructions generally include instructions for receiving, on one or more antennas, symbols transmitted from one or more neighboring base stations, wherein at least one symbol is transmitted from at least one antenna of each base station in N frequency tones with N different phases using a phase pattern from a selected set of phase patterns, and instructions for spatially processing the received symbols to eliminate interference and to decode one or more symbols transmitted from one or more antennas of a serving base station, and wherein the set of phase patterns is selected based on a level of co-channel interference (CCI) at a mobile station (MS).

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered

FIG. 12 illustrates transmission pattern for an exemplary case of two transmit antennas at a serving BS when there is no CCI in the system in accordance with certain embodiments of the present disclosure.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A mobile station (MS) may simultaneously receive signals from a serving base station (BS) and one or more neighboring base stations. Due to interference of signals from different base stations, i.e. a co-channel interference (CCI), a signal from the serving BS may not be properly detected at the MS. The CCI is especially severe in Orthogonal Frequency Division Multiple Access (OFDMA) and Orthogonal Frequency Division Multiplexing (OFDM) systems where it also limits a frequency re-use factor of the wireless network.
Exemplary Wireless Communication System The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

Figure 1:
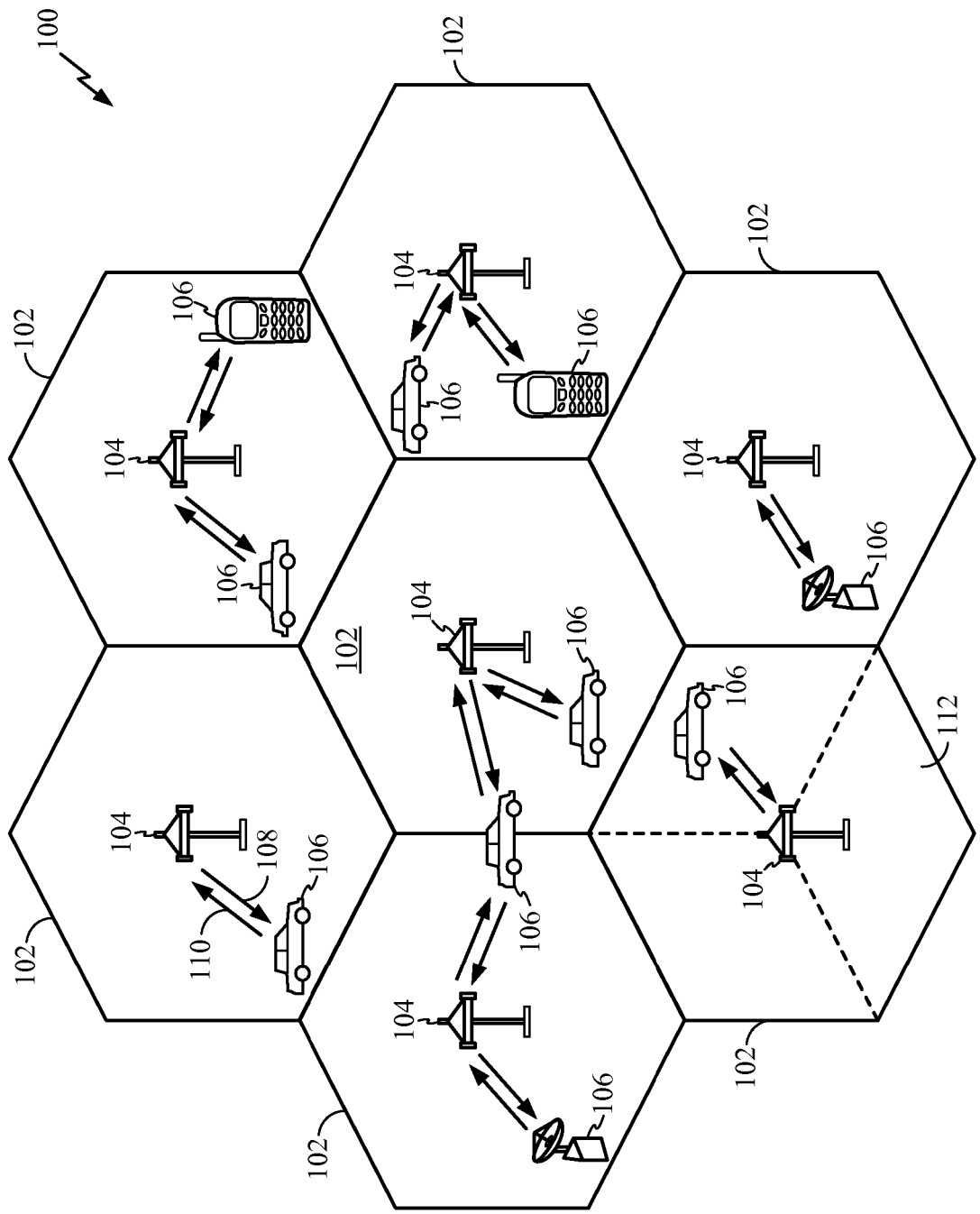
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
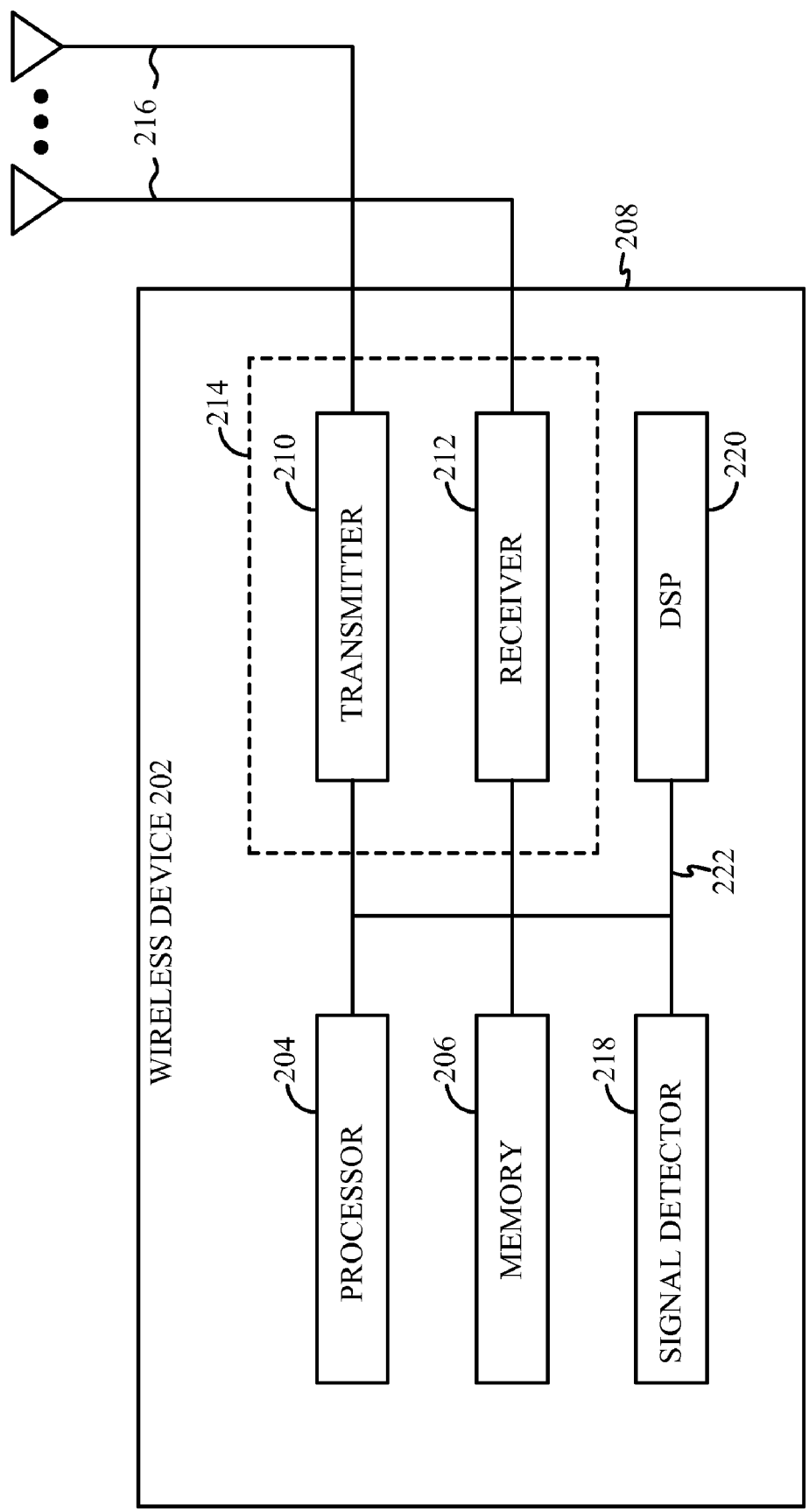
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
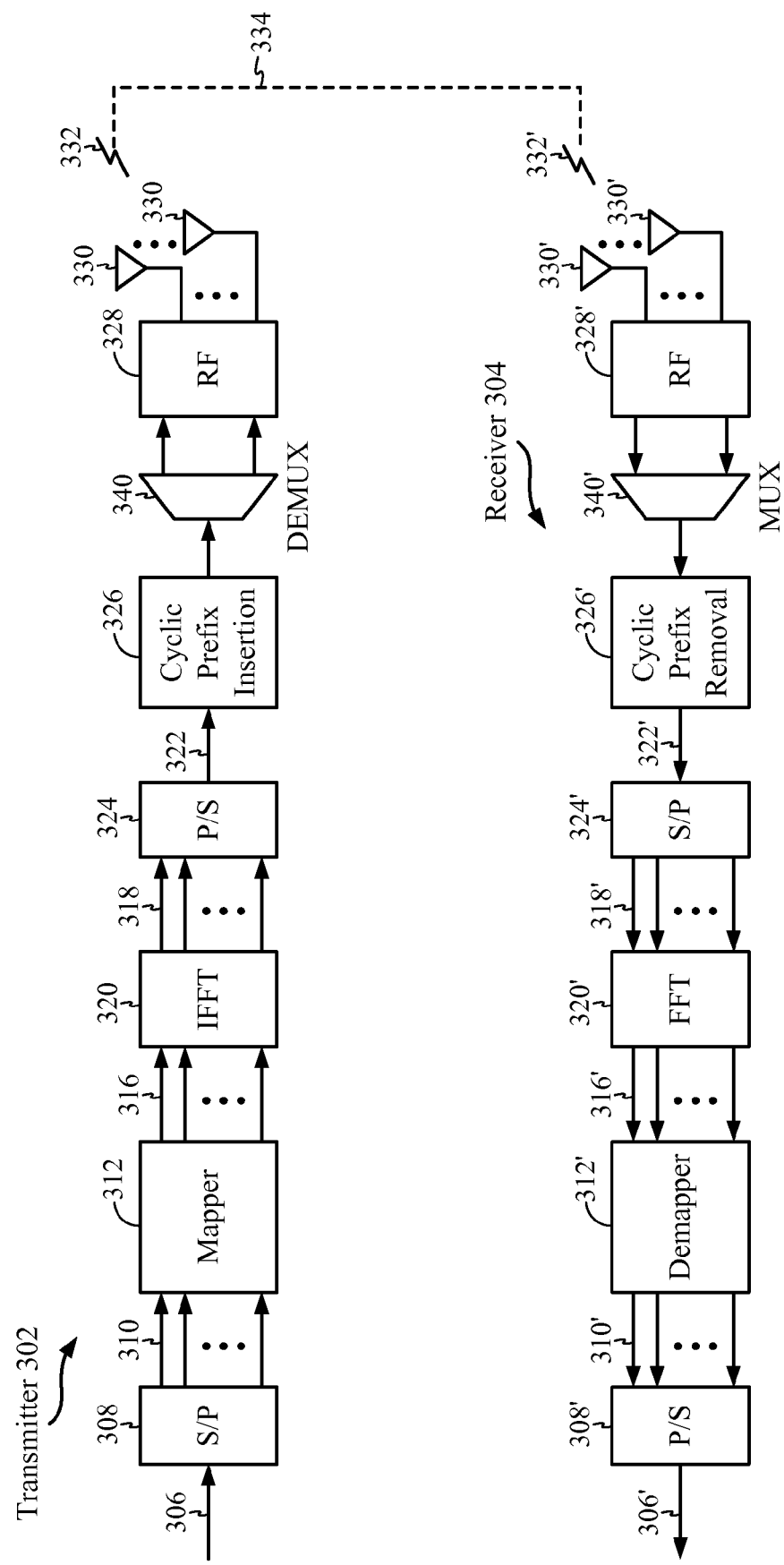
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, NS, is equal to NCP (the number of cyclic prefix (CP) samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A cyclic prefix insertion component 326 may insert a CP between successive OFDM/OFDMA symbols in the OFDM/OFDMA symbol stream 322. The signal from the CP insertion component 326 may then be input into demultiplexer 340 to generate different data streams for a plurality of transmit antennas (or equivalently, spatial subchannels). After that, the base-band data stream for each antenna can be upconverted to a desired transmit frequency band by a radio frequency (RF) front end 328, and the antenna array 330 may then transmit the resulting signal 332 across multiple spatial subchannels 334.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a plurality of spatial subchannels 334. When a signal 332' is received by the antenna array 330', the received signal 332' may be downconverted to a baseband signal by an RF front end 328' and converted into a single stream by multiplexer 340'. A CP removal component 326' may then remove the CP that was inserted between OFDM/OFDMA symbols by the CP insertion component 326.

The output of the CP removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 350'.

A mobile station (MS) 106 from FIG. 1 may simultaneously receive signals from a corresponding serving BS 104 and one or more base stations 104 from neighboring cells 102. Due to interference of signals from different base stations, i.e. a co-channel interference (CCI), a signal from the serving BS 104 may not be properly detected at the MS 106. The CCI may be especially severe in OFDMA and OFDM systems where the strong CCI can limit a frequency re-use factor of the wireless network.

Exemplary Co-Channel Interference Cancellation

Certain embodiments of the present disclosure may help mitigate a CCI by designing special transmission patterns utilized by each neighboring BS including a serving BS. A served MS may distinguish a desired signal from interfering signals, which also leads to a higher frequency re-use factor of a wireless network.

Certain embodiments of the present disclosure provide a spatio-frequency modulation (SFM) scheme for OFDM/OFDMA systems that can mitigate the CCI from neighboring cells around the served MS. Data symbols may be redundantly loaded in a frequency domain with different phases. The MS may utilize phase information to perform an appropriate beam-forming and to decode the desired signal. Since the phase information from interfering cells may be designed to be different from that of the desired (serving) cell, the CCI can be mitigated during this process.

Compared with traditional OFDM systems, the spatio-frequency pattern proposed herein may improve the error rate performance at the MS, particularly when the interference from neighboring base stations is strong. In order to increase the data rate through an additional spatial domain, multiple transmit antennas can be used at each BS in the network and at the MS.

Figure 4:
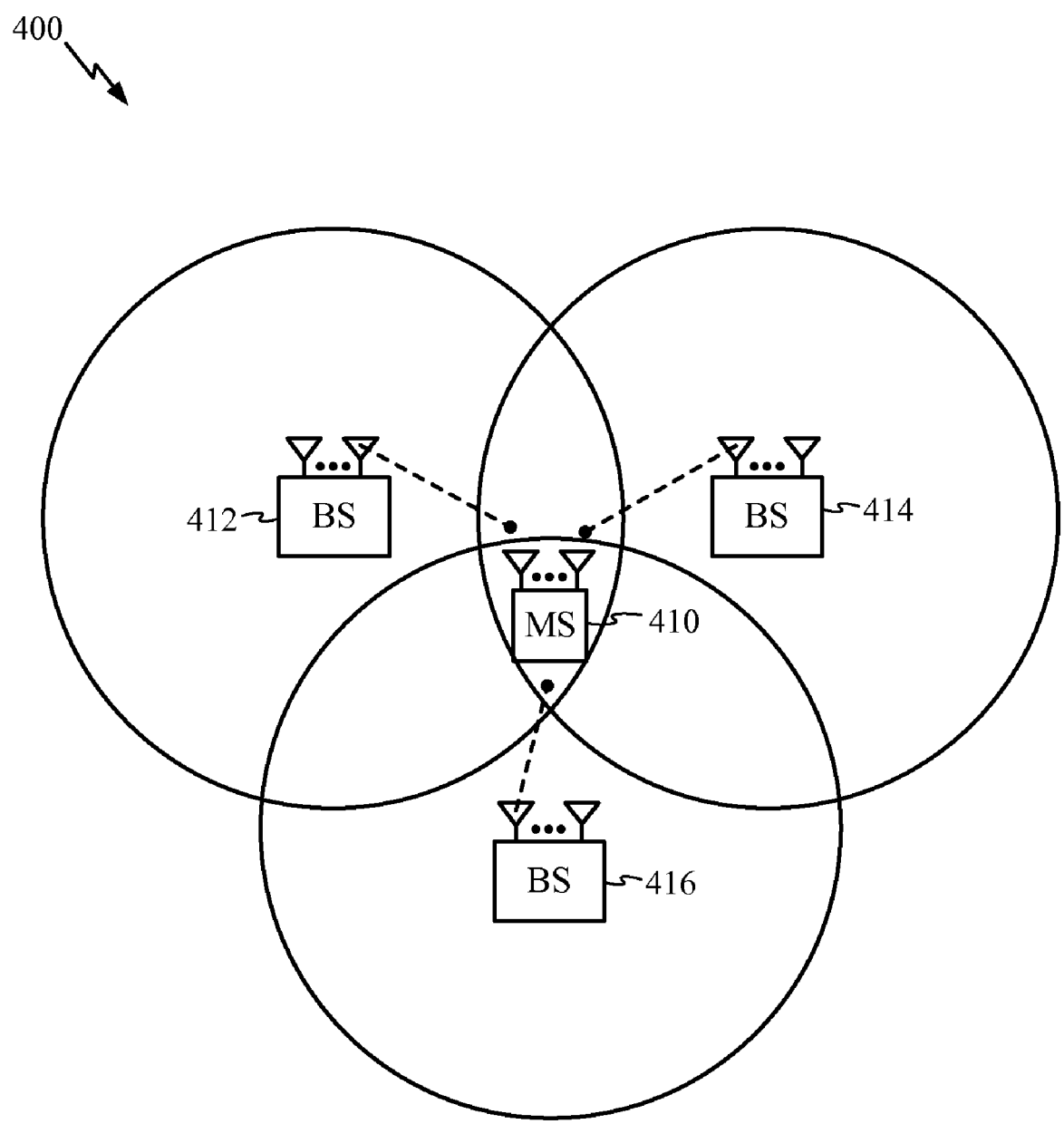
FIG. 4 illustrates a mobile station (MS) at the edge of multiple cells in accordance with certain embodiments of the present disclosure.

The proposed approach may be especially effective at the edge of multiple cells, which is the case illustrated in FIG. 4. The MS 410 may communicate with the serving BS 412, while strong CCI originating from neighboring base stations 414 and 416 may exist. By mitigating the CCI from neighboring cells, the proposed technique may also increase the frequency reuse factor of the network 400.

Exemplary Co-Channel Interference Cancellation Algorithm

Figure 5:
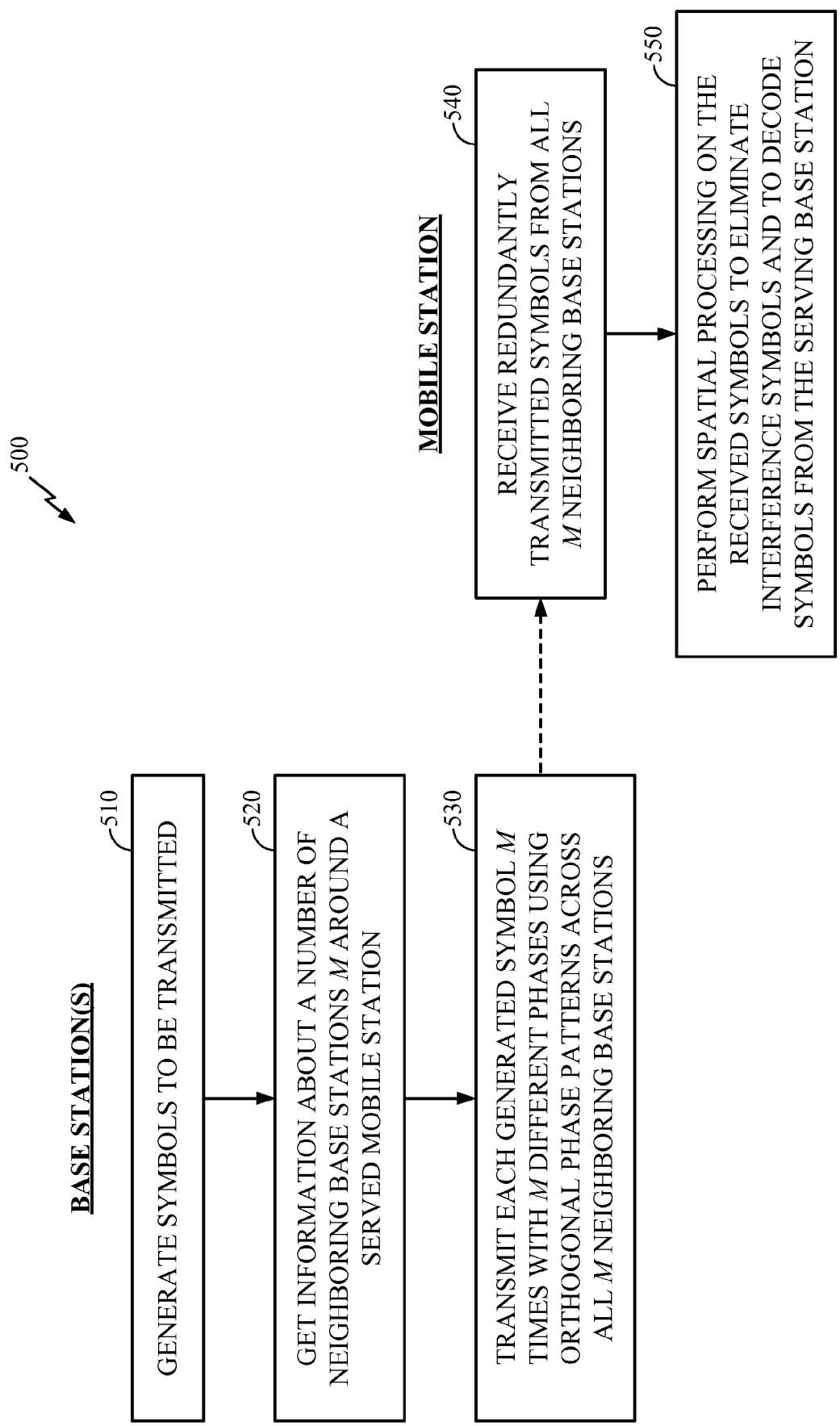
FIG. 5 illustrates example operations for eliminating co-channel interference (CCI) in accordance with certain embodiments of the present disclosure.

FIG. 5 illustrates example operations 500 for eliminating a CCI at a served MS, in accordance with certain embodiments of the present disclosure. Operations 510-530 may be performed in parallel, by a group of M neighboring base stations including also a serving base station (BS), while operations 540 and 550 may be performed by the served MS.

At 510, one or more symbols to be transmitted may be generated at the serving BS. At 520, information about a number of neighboring base stations M that are located around the served MS may be obtained (the number of neighboring base stations M also comprises the serving BS). At 530, each generated symbol may be redundantly transmitted M times with M different phases using orthogonal phase patterns across all M neighboring base stations.

The redundantly transmitted symbols from each neighboring base station may be received at the MS from all M neighboring base stations, at 540. At 550, the received symbols may be spatially processed to eliminate interference symbols and to decode desired symbols transmitted from the serving BS.

Figure 6:
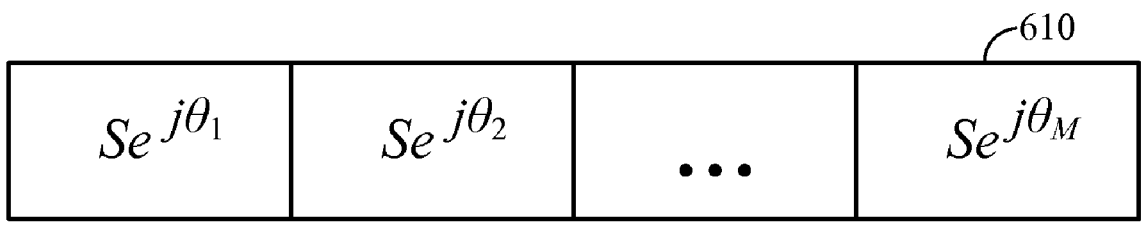
FIG. 6 illustrates a redundant loading of a symbol with different phases for a single transmit antenna at a base station (BS) in accordance with certain embodiments of the present disclosure.

Details about the proposed method for mitigating the CCI may be provided for an exemplary case of a single antenna system: the served MS may use one receive antenna, each neighboring BS (including the serving BS) may also utilize one transmit antenna. Every symbol to be transmitted from each neighboring BS may be loaded redundantly M times across M frequency tones (subcarriers) with M different phases, where M utilized frequency tones may be consecutive frequency tones. This is illustrated in FIG. 6 with a transmission sequence 610, where S represents a symbol to be transmitted from an arbitrary BS to the served MS. It can be observed that this approach may provide M degrees of freedom required to fully cancel the CCI caused by simultaneous transmission from M neighboring base stations and to accurately decode the desired transmission signal at the MS side.

Different base stations should use a different set of phase patterns. If phase patterns for different base stations are orthogonal to one another, then the CCI may be M=2 neighboring base stations BS0 and BS1, the following phase patterns may be applied:

$$[e^{j0}\ e^{j0}]=[1\ 1]\ \text{for BS0}, \qquad (1)$$

$$[e^{j0}\ e^{j\pi}]=[1\ -1]\ \text{for BS1}. \qquad (2)$$

Since the phase patterns given by equations (1) and (2) form a mutually orthogonal set, the MS may perfectly remove the interference signal from the BS1 by applying the beam-former (phase pattern) [1 1] on the received symbols. Similarly, in order to decode data transmitted from the BS1, the phase pattern [1 −1] should be applied on the received symbols. This approach is analogous to the case when the MS uses two physical receive antennas for simultaneous reception of the same symbol with two different phases. Only difference is that the new degree of freedom in the proposed scheme comes not from the space domain but from the frequency domain. Hence, it can be assumed that there are two virtual antennas at the MS, although only one physical antenna may be utilized.

This approach for eliminating the CCI can be extended to the case of M=3 neighboring base stations BS0, BS1 and BS2 around the served MS. The following orthogonal phase set may be applied:

$$[e^{j0}\ e^{j0}\ e^{j0}]\ \text{for BS0}, \qquad (3)$$

$$[e^{j0}\ e^{j2\pi/3}\ e^{j4\pi/3}]\ \text{for BS1}, \qquad (4)$$

$$[e^{j0}\ e^{j4\pi/3}\ e^{j2\pi/3}]\ \text{for BS2}. \qquad (5)$$

Since the phase patterns given by equations (3)-(5) form a mutually orthogonal set, interference signals from the BS1 and the BS2 may be perfectly cancelled by applying the phase pattern [1 1 1] on the received symbols at the MS. On the other hand, interference signals from the BS0 and the BS2 may be eliminated if the phase pattern $[e^{j0}\ e^{-j2\pi/3}\ e^{-j4\pi/3}]$ is applied.

In the general case of M neighboring base stations, the following set of orthogonal phase patterns may be utilized:

$$[e^{j0}\ e^{j0}\ \ldots\ e^{j0}]\ \text{for BS0}, \qquad (6)$$

$$[e^{j0}\ e^{j2\pi/M}\ \ldots\ e^{j2\pi(M-1)/M}]\ \text{for BS1}, \qquad (7)$$

$$[e^{j0}\ e^{j4\pi/M}\ \ldots\ e^{j4\pi(M-1)/M}]\ \text{for BS2}, \qquad (8)$$

$$[e^{j0}\ e^{j2\pi k/M}\ \ldots\ e^{j2\pi k(M-1)/M}]\ \text{for BSk} \qquad (9)$$

where k=0,1, . . . ,M−1. For this particular set of phase patterns, the beam-former applied at the MS in order to detect a signal transmitted from an arbitrary kth base station (k=0,1, . . . ,M−1) may be:

$$[e^{j0}\ e^{-j2\pi k/M}\ \ldots\ e^{-j2\pi k(M-1)/M}]. \qquad (10)$$

It can be noted that a set of phase patterns given by equations (6)-(9) is one possible solution and not the only orthogonal set in the case of neighboring base stations around the served MS.

Capability of the proposed CCI cancellation scheme may come at the expense of a transmission data rate reduction due to the redundant nature of transmission. In the case of M neighboring base stations, one symbol may need to be sent redundantly M times with M different phases from each base station, which decreases the data rate by a factor of M. In order to increase the date rate while applying the proposed CCI cancellation technique, a plurality of antennas at each base station and at the served MS may be employed.

Figure 7:
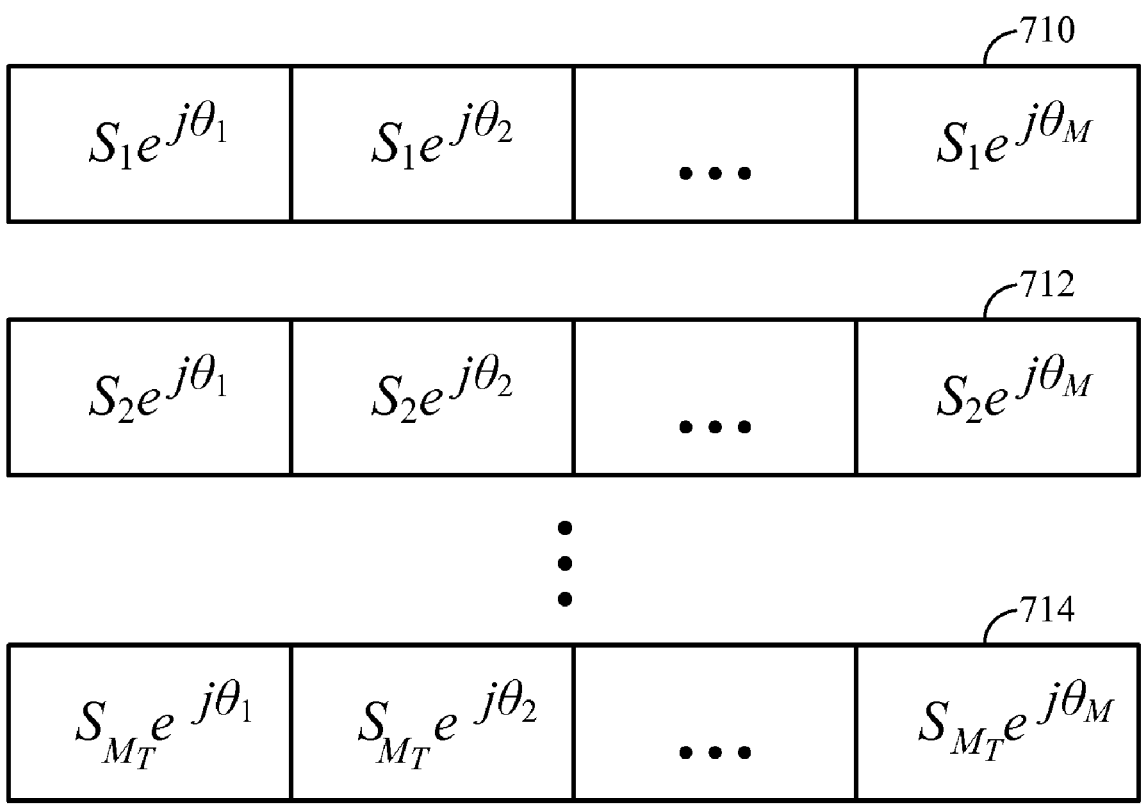
FIG. 7 illustrates a redundant loading of a plurality of symbols with different phases for a plurality of transmit antenna at a BS in accordance with certain embodiments of the present disclosure.

Extension of the proposed CCI cancellation scheme to a multiple-input multiple-output (MIMO) system is illustrated in FIG. 7. A sequence 710 may be transmitted from an antenna 1 of a base station from the plurality of M neighboring base stations around the MS. Also, a sequence 712 may be transmitted from an antenna 2 of the base station, and a sequence 714 may be transmitted from an antenna $M_T$ of the base station. It can be also observed from FIG. 7 that the same phase pattern may be utilized across all transmit antennas on the same base station. Each base station among the M neighboring base stations may utilize different spatio-frequency pattern.

Exemplary Spatio-Frequency Transmission and Reception with Co-Channel Interference Using Multiple Transmit and/or Receive Antennas Certain embodiments of the present disclosure relate to a wireless network with two antennas at one or all neighboring BS and/or two antennas at a served MS. Schemes to be described for signal transmission and reception based on spatio-frequency modulation (SFM) can be extended to a general case of $M_T$ antennas at each neighboring BS, where $M_T > 2$.

Figures 8, 9:
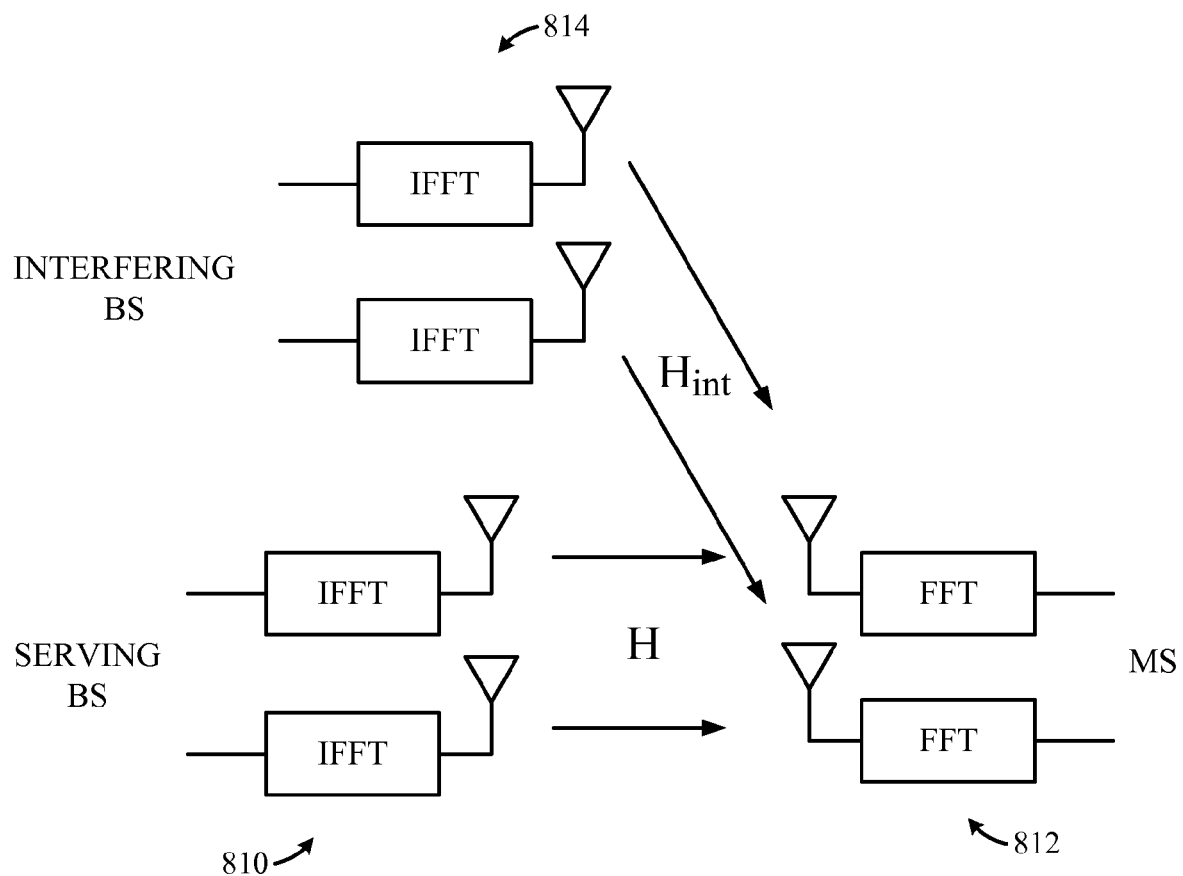
FIG. 8 illustrates an example wireless system with one serving BS and one interfering BS in accordance with certain embodiments of the present disclosure.
FIG. 9 illustrates a transmission pattern for an exemplary case of two transmit antennas at a BS in accordance with certain embodiments of the present disclosure.

FIG. 8 illustrates an example wireless system with two neighboring base stations 810 and 814 and the served MS 812. Each communication entity in the network may utilize two transmit antennas. It can be noted that the BS 810 is the serving BS, while the BS 814 is the interfering BS that may cause a CCI at the MS 812. A channel matrix H of size 2×2 may comprise complex gains of channels between antennas of the serving BS 810 and the served MS 812. Similarly, a channel matrix $H_{int}$ of size 2×2 may comprise complex gains of channels between antennas of the interfering BS 814 and the served MS 812.

It can be assumed that the channel gains in adjacent frequency tones (subcarriers) are the same, which is valid assumption in a well-designed OFDM system. In addition, it can be assumed that the received signals from all neighboring base stations are time-synchronized, which is also valid assumption because base stations may be synchronized through a backbone of the WiMAX network.

FIG. 9 illustrates a newly proposed SFM pattern for the exemplary case shown in FIG. 8, where f(k) may represent the kth frequency tone (subcarrier) of the OFDM symbol. In other words, the base station may load the data symbol $S_1$ to the kth frequency tone of antenna 1, and the data symbol $S_2$ may be loaded to the kth frequency tone of antenna 2.

Ideally, a parameter θ specified in FIG. 9 may be selected such that to form an orthogonal set of phase patterns. Therefore, if there are two adjacent base stations, one base station may use θ=0 and the other base station may use θ=π. However, it can be assumed, without loss of generality, that θ=0 may be used for the serving base station 810 in FIG. 8, and some value θ may be used for the interfering base station 814. Then, received signals for the kth and (k+1)th frequency tone at the served MS 812 may be represented as:

$$Y_k = H \cdot x + H_{int} \cdot x_{int} + n_k, \quad (11)$$

$$Y_{k+1} = H \cdot x + H_{int} \cdot x_{int} \cdot e^{j\theta} + n_{k+1}, \quad (12)$$

where $$x = \begin{bmatrix} S_1 \\ S_2 \end{bmatrix}, \quad x_{int} = \begin{bmatrix} S_{i1} \\ S_{i2} \end{bmatrix},$$

$S_1$ and $S_2$ may represent symbols transmitted from the serving base station 810, and $S_{i1}$ and $S_{i2}$ may represent interference symbols from the interfering base station 814.

In order to accurately decode symbols transmitted from the serving BS, the served MS may first perform noise-plus-interference estimation of a four-dimensional space composed of two receive antennas and two frequency tones. The MS may then perform noise whitening on a calculated correlation matrix. In one embodiment of the present disclosure, the MS may perform the linear minimum mean square error (LMMSE) decoding on the received symbols. In another embodiment of the present disclosure, the MS may perform the minimum variance distortionless response (MVDR) decoding to extract the desired signal transmitted from the serving BS. The MVDR algorithm represents a receiver beamforming method that may suppress a power of interference subject to a distortionless constraint in a desired direction. After decoding, the MS may estimate symbols $S_1$ and $S_2$ transmitted from the serving BS.

If the CCI is strong (i.e., greater than a predefined threshold), then the combined process of noise-whitening and the LMMSE (or the MVDR) decoding may tend to focus on removing only the interference term, i.e., the beam-former (phase pattern) of $[1 \; e^{-j\theta}]$ may be applied to the received signal $Y_k$ and $Y_{k+1}$ to cancel the CCI. Since the parameter θ may be already known to the MS, the combined process of noise-whitening and the LMMSE (or the MVDR) decoding may be greatly simplified.

Figure 10:
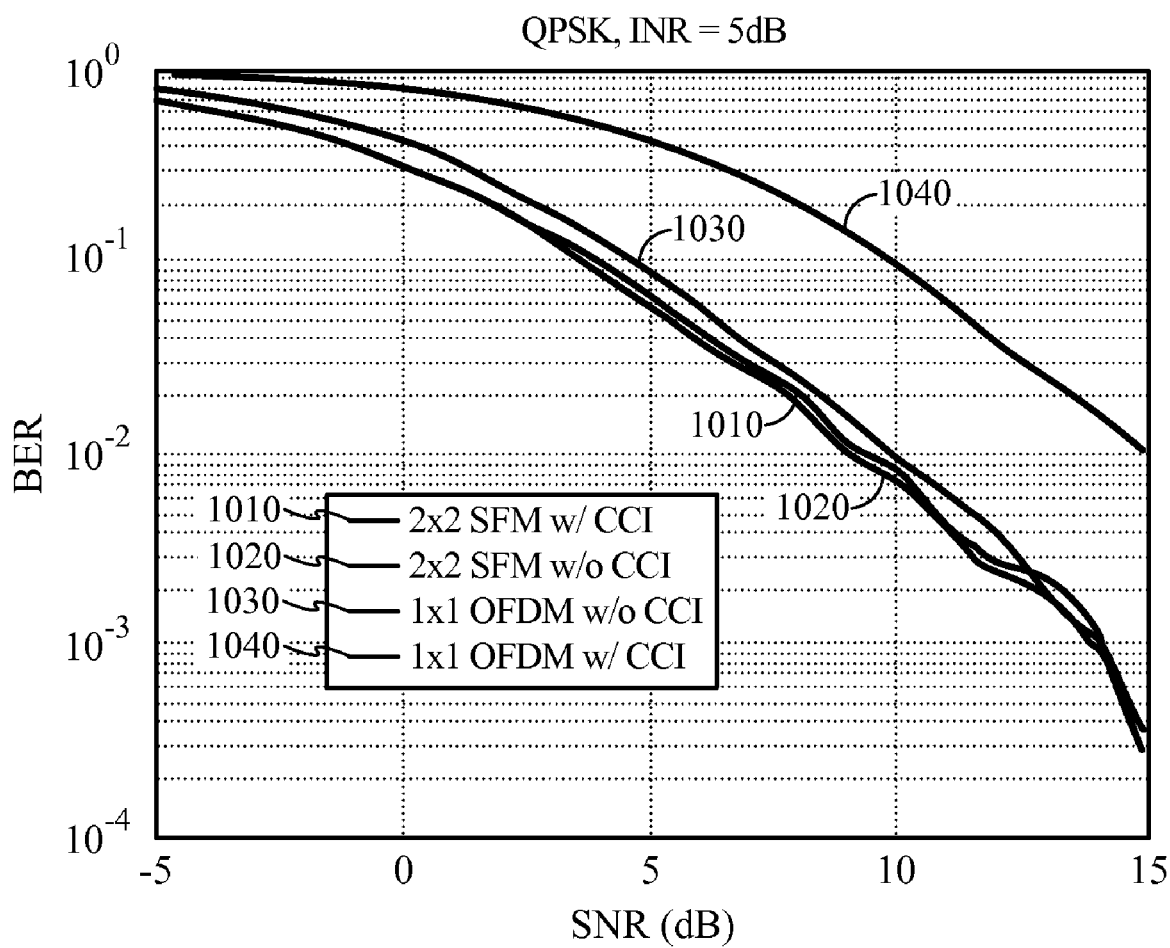
FIG. 10 illustrates a graph of example bit error rate (BER) performance of different transmission schemes for an interference-to-noise ratio (INR) of 5 dB in accordance with certain embodiments of the present disclosure.
Figure 11:
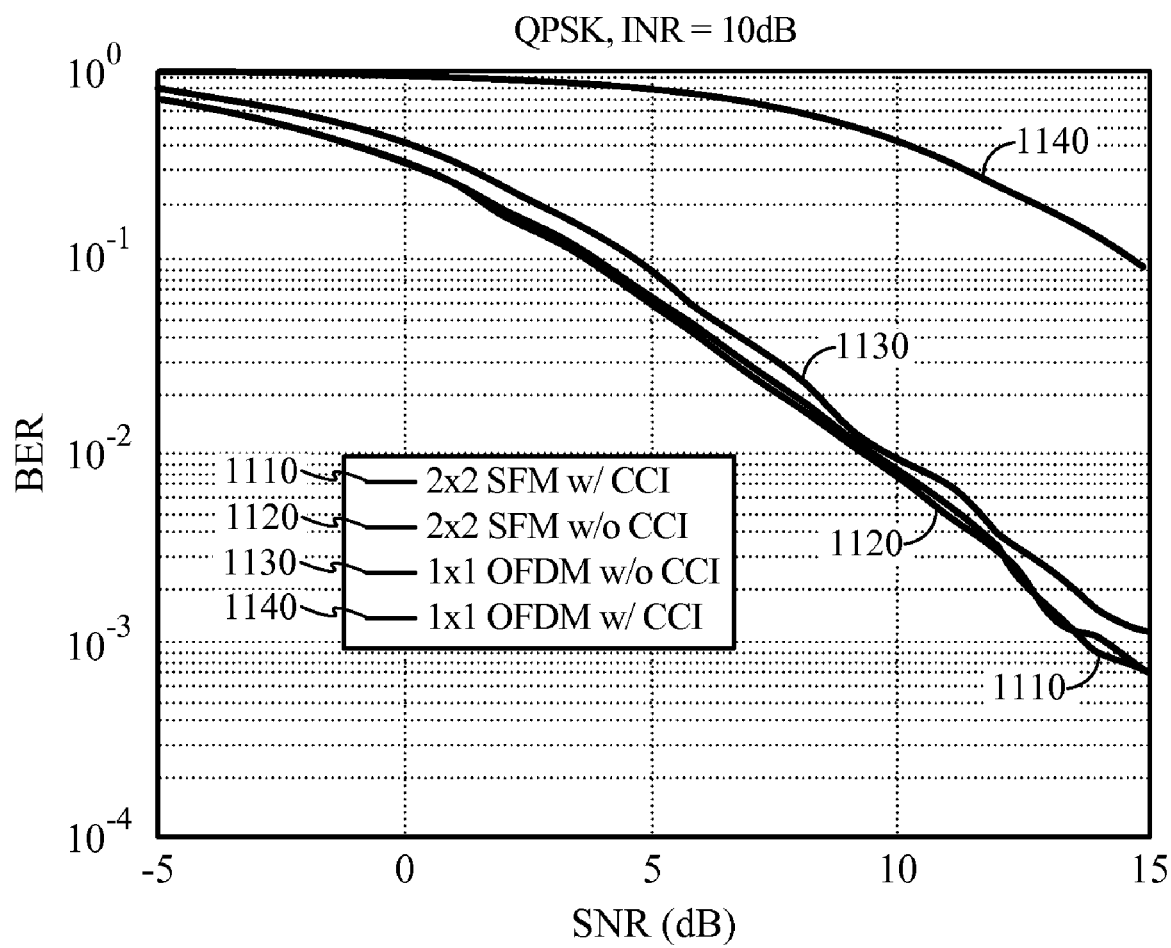
FIG. 11 illustrates a graph of example BER performance of different transmission schemes for the INR of 10 dB in accordance with certain embodiments of the present disclosure.

FIGS. 10-11 illustrate graphs of example bit error rate (BER) performance of different transmission schemes for interference-to-noise ratio (INR) of 5 dB and 10 dB, respectively. It can be noted that the newly proposed SFM scheme represented with plots 1010 and 1110 may be almost immune to the very strong CCI. On the other hand, the conventional OFDM system represented with plots 1040 and 1140 may suffer a big loss when the CCI is present. If there is no CCI in the system, both the proposed SFM scheme with CCI cancellation capability and the conventional OFDM may provide similar performance (i.e., plots 1020 and 1030 in FIG. 10, and plots 1120 and 1130 in FIG. 11, respectively).

Perfect channel estimation at the MS side can be assumed for all simulated cases illustrated in FIGS. 10-11. In practice, however, the quality of channel estimation in a traditional single-input single-output (SISO) system may degrade considerably in the presence of a strong CCI. Since this typically does not occur if the SFM scheme is applied, the gap between the proposed 2×2 SFM scheme (i.e., plots 1010 and 1110) and the conventional 1×1 OFDM technique (i.e., plots 1040 and 1140) may be even larger in the case when channels are estimated at the MS.

Exemplary Spatio-Frequency Transmission and Reception Without Co-Channel Interference Certain embodiments of the present disclosure relate to transmission and reception schemes for mitigating interference between signals simultaneously transmitted from different antennas of a serving BS. It can be assumed that there is no CCI in the system or the CCI caused by neighboring interfering base stations is weak and below a predefined threshold. In this case, instead of canceling the interference from neighboring BSs, the proposed SFM structure may be used to improve decoding of a desired signal transmitted from the serving BS.

FIG. 12 illustrates the proposed spatio-frequency modulation (SFM) transmission pattern for an exemplary case of two transmit antennas at the serving BS. A parameter $\theta_1$ may be set to zero, while $\theta_2=\pi$. Therefore, the phase difference may be utilized in order to distinguish streams from different antennas mounted on the same base station. However, this may be possible only if there is no CCI in the system or when the CCI is weak and below the predefined threshold. Symbols with different phases may be transmitted from each transmit antenna of the serving BS in consecutive frequency tones.

For the exemplary case of two transmit antennas at the serving BS, received signals at a served MS for the kth and (k+1)th frequency tones may be represented as:

$$Y_k = H \cdot x_k + n_k, \quad (13)$$

$$Y_{k+1} = H \cdot x_{k+1} + n_{k+1}, \quad (14)$$

where $$x_k = \begin{bmatrix} S_1 \\ S_2 \end{bmatrix}, \quad x_{k+1} = \begin{bmatrix} S_1 \\ -S_2 \end{bmatrix},$$

if $\theta_1=0$ and $\theta_2=\pi$. $S_1$ and $S_2$ may represent symbols transmitted from the 1st and the 2nd transmit antenna of the serving base station, respectively.

In order to decode transmitted symbol $S_1$, the beam-former (phase pattern) of $\lfloor 1\ e^{j\Theta_1} \rfloor$ mutually orthogonal with the phase pattern $\lfloor 1\ e^{j\Theta_2} \rfloor$ may be applied to the received signals $Y_k$, and $Y_{k+1}$ to cancel the interference signal from the 2nd transmit antenna of the serving BS. On the other hand, in order to decode transmitted symbol $S_2$, the beam-former (phase pattern) of $\lfloor 1\ e^{j\Theta_2} \rfloor$ mutually orthogonal with the phase pattern $\lfloor 1\ e^{j\Theta_1} \rfloor$ may be applied to the received signals $Y_k$, and $Y_{k+1}$ to cancel the interference signal from the 1st transmit antenna of the serving BS.

Figure 13:
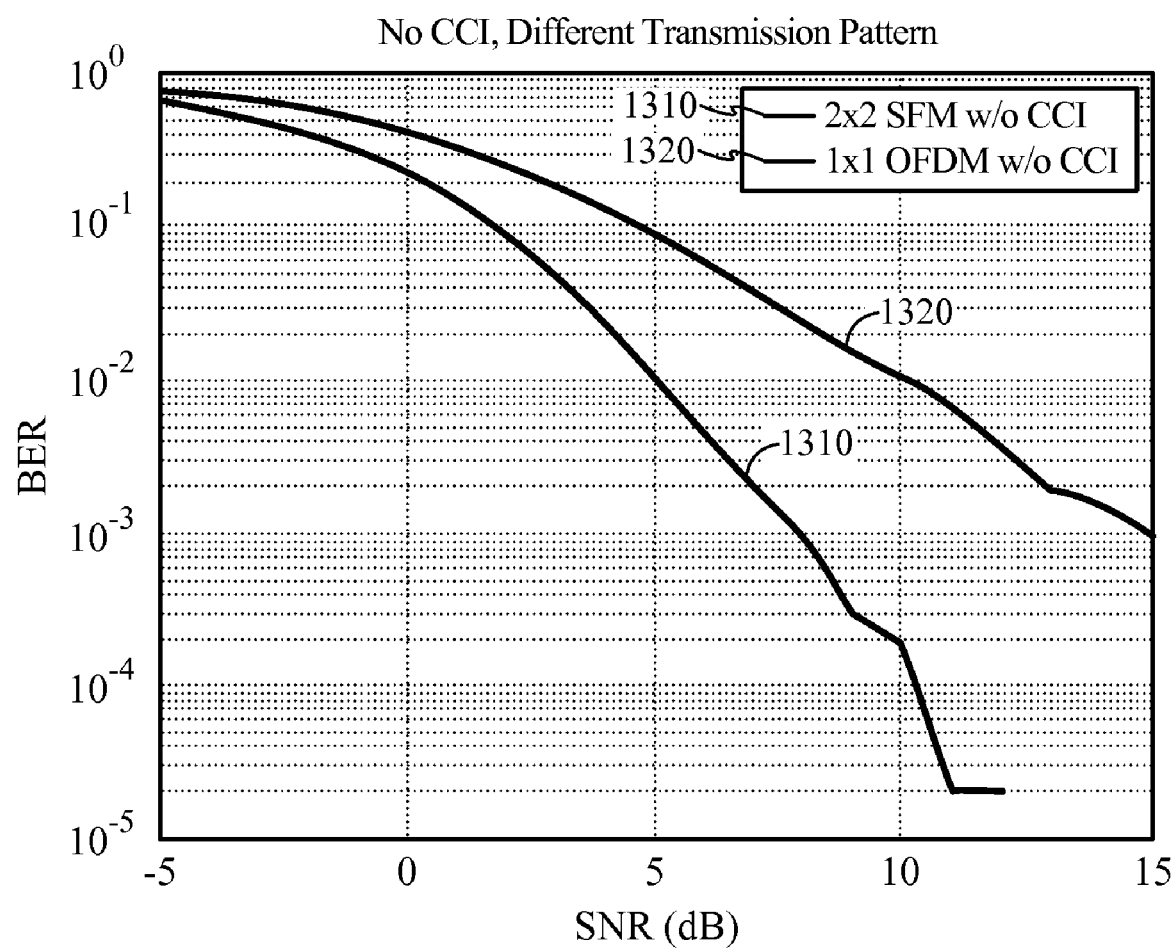
FIG. 13 illustrates a graph of example BER performance of different transmission schemes if there is no CCI in the system in accordance with certain embodiments of the present disclosure.

By applying this approach, the interference between two streams transmitted from two antennas of the same serving base station may be efficiently mitigated. FIG. 13 illustrates a graph of example BER performance of different transmission schemes if there is no CCI in the system. It can be observed that the proposed SFM scheme illustrated in FIG. 12 and represented with the plot 1310 may significantly outperform the conventional SISO OFDM system represented with the plot 1320.

The CCI may be monitored in higher layers (such as, for example Media Access Layer (MAC)), and then signaled to the served mobile station and all other neighboring base stations through a backbone of the wireless network. The appropriate SFM transmission approach may be then applied at each neighboring base station according to the detected level of CCI. The proposed SFM transmission scheme may not be only limited to data channels, but it can be also utilized for any other channel types, e.g. pilot channels and control channels.

Figure 5A:
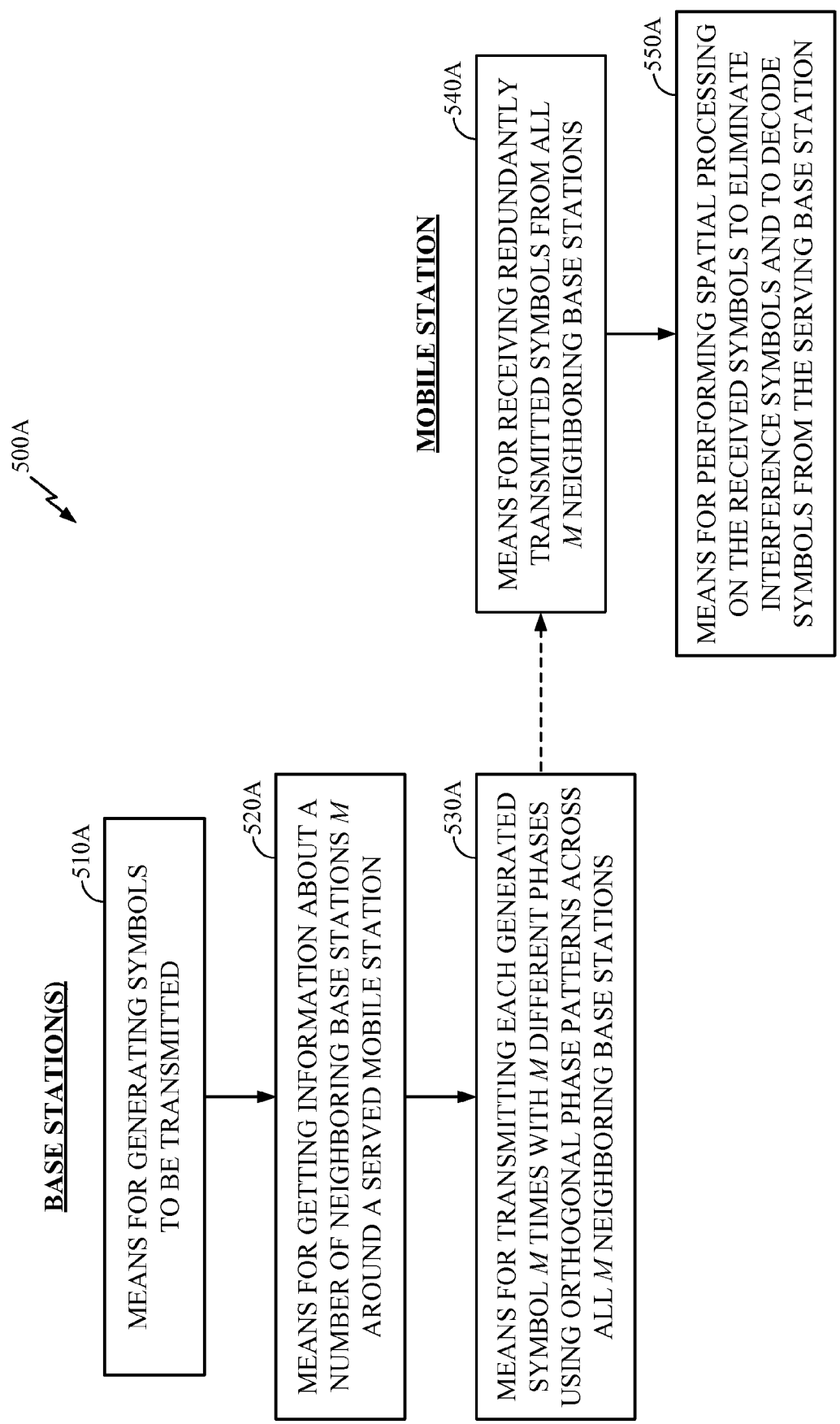
FIG. 5A illustrates example components capable of performing the operations illustrated in FIG. 5.

The various operations of methods described above may be performed by various hardware and/or software component(s) and/or module(s) corresponding to means-plus-function blocks illustrated in the Figures. For example, blocks 510-550 illustrated in FIG. 5 correspond to means-plus-function blocks 510A-550A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for a wireless communications, comprising:
generating at least one symbol to be transmitted;
obtaining information about a number of neighboring base stations M around a served mobile station (MS); and
transmitting, on one or more antennas from each of the M neighboring base stations, the at least one symbol in N frequency tones with N different phases using a phase pattern from a selected set of phase patterns, wherein the set of phase patterns is selected based on a level of co-channel interference (CCI) at the MS.

2. The method of claim 1, wherein each antenna used for transmission transmits a symbol in N frequency tones with N different phases using the phase pattern from the selected set of phase patterns.

3. The method of claim 2, wherein the same phase pattern is applied for all of the one or more antennas used for transmission at each neighboring base station, and wherein phase patterns from the selected set of phase patterns are orthogonal across the M neighboring base stations, where N=M, if the level of CCI is larger than a predefined threshold.

4. The method of claim 2, wherein a different phase pattern is applied for each antenna used for transmission at a base station from the M neighboring base stations, and wherein the applied phase patterns are orthogonal across all antennas used for transmission at the base station, where N is a number of antennas used for transmission at the base station, if the level of CCI is smaller than a predefined threshold.

5. The method of claim 1, wherein the N frequency tones comprise N consecutive frequency tones.

6. The method of claim 1, wherein the at least one generated symbol comprises at least one data symbol.

7. The method of claim 1, wherein the at least one generated symbol comprises at least one pilot symbol.

8. A method for a wireless communications, comprising:
receiving, on one or more antennas, symbols transmitted from one or more neighboring base stations, wherein at least one symbol is transmitted from at least one antenna of each base station in N frequency tones with N different phases using a phase pattern from a selected set of phase patterns; and
spatially processing the received symbols to eliminate interference and to decode one or more symbols transmitted from one or more antennas of a serving base station; and
wherein the set of phase patterns is selected based on a level of co-channel interference (CCI) at a mobile station (MS).

9. The method of claim 8, wherein spatially processing the received symbols comprises:
applying an appropriate phase pattern on the received symbols to eliminate interference symbols and to decode the one or more symbols transmitted from the one or more antennas of the serving base station, if the level of CCI is larger than a predefined threshold value.

10. The method of claim 8, wherein spatially processing the received symbols comprises:
applying a noise whitening and a linear minimum mean square error (LMMSE) decoding to eliminate interference symbols and to decode the one or more symbols transmitted from the one or more antennas of the serving base station, if the level of CCI is smaller than a predefined threshold value.

11. The method of claim 8, wherein spatially processing the received symbols comprises:
applying a noise whitening and a minimum variance distortionless response (MVDR) decoding to eliminate interference symbols and to decode the one or more symbols transmitted from the one or more antennas of the serving base station, if the level of CCI is smaller than a predefined threshold value.

12. The method of claim 8, wherein the N frequency tones comprise N consecutive frequency tones.

13. An apparatus for a wireless communications, comprising:
logic for generating at least one symbol to be transmitted;
logic for obtaining information about a number of neighboring base stations M around a served mobile station (MS); and
logic for transmitting, on one or more antennas from each of the M neighboring base stations, the at least one symbol in N frequency tones with N different phases using a phase pattern from a selected set of phase patterns, wherein the set of phase patterns is selected based on a level of co-channel interference (CCI) at the MS.

14. The apparatus of claim 13, wherein each antenna used for transmission transmits a symbol in N frequency tones with N different phases using the phase pattern from the selected set of phase patterns.

15. The apparatus of claim 14, wherein the same phase pattern is applied for all of the one or more antennas used for transmission at each neighboring base station, and wherein the phase patterns from the selected set of phase patterns are orthogonal across the M neighboring base stations, where N=M, if the level of CCI is larger than a predefined threshold.

16. The apparatus of claim 14, wherein a different phase pattern is applied for each antenna used for transmission at a base station from the M neighboring base stations, and wherein the applied phase patterns are orthogonal across all antennas used for transmission at the base station, where N is a number of antennas used for transmission at the base station, if the level of CCI is smaller than a predefined threshold.

17. The apparatus of claim 13, wherein the N frequency tones comprise N consecutive frequency tones.

18. The apparatus of claim 13, wherein the at least one generated symbol comprises at least one data symbol.

19. The apparatus of claim 13, wherein the at least one generated symbol comprises at least one pilot symbol.

20. An apparatus for a wireless communications, comprising:
logic for receiving, on one or more antennas, symbols transmitted from one or more neighboring base stations, wherein at least one symbol is transmitted from at least one antenna of each base station in N frequency tones with N different phases using a phase pattern from a selected set of phase patterns; and logic for spatially processing the received symbols to eliminate interference and to decode one or more symbols transmitted from one or more antennas of a serving base station; and wherein the set of phase patterns is selected based on a level of co-channel interference (CCI) at a mobile station (MS).

21. The apparatus of claim 20, wherein the logic for spatially processing the received symbols comprises:

logic for applying an appropriate phase pattern on the received symbols to eliminate interference symbols and to decode the one or more symbols transmitted from the one or more antennas of the serving base station, if the level of CCI is larger than a predefined threshold value.

22. The apparatus of claim 20, wherein the logic for spatially processing the received symbols comprises:

logic for applying a noise whitening and a linear minimum mean square error (LMMSE) decoding to eliminate interference symbols and to decode the one or more symbols transmitted from the one or more antennas of the serving base station, if the level of CCI is smaller than a predefined threshold value.

23. The apparatus of claim 20, wherein the logic for spatially processing the received symbols comprises:

logic for applying a noise whitening and a minimum variance distortionless response (MVDR) decoding to eliminate interference symbols and to decode the one or more symbols transmitted from the one or more antennas of the serving base station, if the level of CCI is smaller than a predefined threshold value.

24. The apparatus of claim 20, wherein the N frequency tones comprise N consecutive frequency tones.

25. An apparatus for a wireless communications, comprising:

means for generating at least one symbol to be transmitted;

means for obtaining information about a number of neighboring base stations M around a served mobile station (MS); and means for transmitting, on one or more antennas from each of the M neighboring base stations, the at least one symbol in N frequency tones with N different phases using a phase pattern from a selected set of phase patterns, wherein the set of phase patterns is selected based on a level of co-channel interference (CCI) at the MS.

26. The apparatus of claim 25, wherein each antenna used for transmission transmits a symbol in N frequency tones with N different phases using the phase pattern from the selected set of phase patterns.

27. The apparatus of claim 26, wherein the same phase pattern is applied for all of the one or more antennas used for transmission at each neighboring base station, and wherein the phase patterns from the selected set of phase patterns are orthogonal across the M neighboring base stations, where N=M, if the level of CCI is larger than a predefined threshold.

28. The apparatus of claim 26, wherein a different phase pattern is applied for each antenna used for transmission at a base station from the M neighboring base stations, and wherein the applied phase patterns are orthogonal across all antennas used for transmission at the base station, where N is a number of antennas used for transmission at the base station, if the level of CCI is smaller than a predefined threshold.

29. The apparatus of claim 25, wherein the N frequency tones comprise N consecutive frequency tones.

30. The apparatus of claim 25, wherein the at least one generated symbol comprises at least one data symbol.

31. The apparatus of claim 25, wherein the at least one generated symbol comprises at least one pilot symbol.

32. An apparatus for a wireless communications, comprising:

means for receiving, on one or more antennas, symbols transmitted from one or more neighboring base stations, wherein at least one symbol is transmitted from at least one antenna of each base station in N frequency tones with N different phases using a phase pattern from a selected set of phase patterns; and means for spatially processing the received symbols to eliminate interference and to decode one or more symbols transmitted from one or more antennas of a serving base station; and wherein the set of phase patterns is selected based on a level of co-channel interference (CCI) at a mobile station (MS).

33. The apparatus of claim 32, wherein the means for spatially processing the received symbols comprises:

means for applying an appropriate phase pattern on the received symbols to eliminate interference symbols and to decode the one or more symbols transmitted from the one or more antennas of the serving base station, if the level of CCI is larger than a predefined threshold value.

34. The apparatus of claim 32, wherein the means for spatially processing the received symbols comprises:

means for applying a noise whitening and a linear minimum mean square error (LMMSE) decoding to eliminate interference symbols and to decode the one or more symbols transmitted from the one or more antennas of the serving base station, if the level of CCI is smaller than a predefined threshold value.

35. The apparatus of claim 32, wherein the means for spatially processing the received symbols comprises:

means for applying a noise whitening and a minimum variance distortionless response (MVDR) decoding to eliminate interference symbols and to decode the one or more symbols transmitted from the one or more antennas of the serving base station, if the level of CCI is smaller than a predefined threshold value.

36. The apparatus of claim 32, wherein the N frequency tones comprise N consecutive frequency tones.

37. A computer-program product for a wireless communications, comprising a computer-readable memory having instructions stored thereon, the instructions being executable by one or more processors and the instructions comprising:

instructions for generating at least one symbol to be transmitted;

instructions for obtaining information about a number of neighboring base stations M around a served mobile station (MS); and instructions for transmitting, on one or more antennas from each of the M neighboring base stations, the at least one symbol in N frequency tones with N different phases using a phase pattern from a selected set of phase patterns, wherein the set of phase patterns is selected based on a level of co-channel interference (CCI) at the MS.

38. The computer-program product of claim 37, wherein each antenna used for transmission transmits a symbol in N frequency tones with N different phases using the phase pattern from the selected set of phase patterns.

39. The computer-program product of claim 38, wherein the same phase pattern is applied for all of the one or more antennas used for transmission at each neighboring base station, and wherein the phase patterns from the selected set of phase patterns are orthogonal across the M neighboring base stations, where N=M, if the level of CCI is larger than a predefined threshold.

40. The computer-program product of claim 38, wherein a different phase pattern is applied for each antenna used for transmission at a base station from the M neighboring base stations, and wherein the applied phase patterns are orthogonal across all antennas used for transmission at the base station, where N is a number of antennas used for transmission at the base station, if the level of CCI is smaller than a predefined threshold.

41. The computer-program product of claim 37, wherein the N frequency tones comprise N consecutive frequency tones.

42. The computer-program product of claim 37, wherein the at least one generated symbol comprises at least one data symbol.

43. The computer-program product of claim 37, wherein the at least one generated symbol comprises at least one pilot symbol.

44. A computer-program product for a wireless communications, comprising a computer-readable memory having instructions stored thereon, the instructions being executable by one or more processors and the instructions comprising:
- instructions for receiving, on one or more antennas, symbols transmitted from one or more neighboring base stations, wherein at least one symbol is transmitted from at least one antenna of each base station in N frequency tones with N different phases using a phase pattern from a selected set of phase patterns; and
- instructions for spatially processing the received symbols to eliminate interference and to decode one or more symbols transmitted from one or more antennas of a serving base station; and
- wherein the set of phase patterns is selected based on a level of co-channel interference (CCI) at a mobile station (MS).

45. The computer-program product of claim 44, wherein the instructions for spatially processing the received symbols comprise:
- instructions for applying an appropriate phase pattern on the received symbols to eliminate interference symbols and to decode the one or more symbols transmitted from the one or more antennas of the serving base station, if the level of CCI is larger than a predefined threshold value.

46. The computer-program product of claim 44, wherein the instructions for spatially processing the received symbols comprise:
- instructions for applying a noise whitening and a linear minimum mean square error (LMMSE) decoding to eliminate interference symbols and to decode the one or more symbols transmitted from the one or more antennas of the serving base station, if the level of CCI is smaller than a predefined threshold value.

47. The computer-program product of claim 44, wherein the instructions for spatially processing the received symbols comprise:
- instructions for applying a noise whitening and a minimum variance distortionless response (MVDR) decoding to eliminate interference symbols and to decode the one or more symbols transmitted from the one or more antennas of the serving base station, if the level of CCI is smaller than a predefined threshold value.

48. The computer-program product of claim 44, wherein the N frequency tones comprise N consecutive frequency tones.

* * * * *